Patented Oct. 24, 1939

2,177,422

UNITED STATES PATENT OFFICE 2,177,422

PLANT CULTIVATION

Miller W. Swaney, Bloomfield, N. J., assignor to Ellis Laboratories, Inc., a corporation of New Jersey No Drawing. Application May 3, 1938, Serial No. 205,735

3 Claims. (Cl. 47—1.2)

This invention relates to the cultivation and propagation of fruits and plants by hydroculture methods, i. e., procedures which involve growing plants in aqueous solutions containing dissolved nutrients and not in soil. This invention also relates to regulating the height to which certain plants may attain and to improving their capacity to produce fruit or flowers.

In hydroculture methods, which are often designed water-culture, nutrient solution culture, or soilless growth, the plant is grown with its roots always immersed in or in contact with an aqueous solution of those bodies which are plant foods and are readily assimilable. Of the latter the most easily available and handled are inorganic salts. As is well known, the elements required in the largest proportions by growing vegetative material are phosphorus, nitrogen, potassium and calcium. Examples of soluble inorganic salts which may be employed to supply such elements are calcium acid phosphate (for calcium and phosphorus), sodium nitrate (for nitrogen) and potassium sulphate (for potassium). Aqueous solutions having the proper concentration of such salts, or of other appropriate compounds, serving as nutrients for the plants under cultivation are called nutrient solutions or nutrient liquors. In addition, certain trace elements, or those needed in very minute quantities, should be present also. Illustrations of the latter are iron, copper, manganese, zinc and the like. Such elements in the form of water-soluble compounds, e. g., the corresponding chlorides, nitrates or sulphates, may be added to the nutrient solution in the proportions, say, of a few parts per million of liquid.

There are many advantages in growing plants with the aid of nutrient solutions rather than in soil. For example, food ingredients in the latter, whether initially present or added in the form of fertilizing material, must be dissolved in water present in the ground before they can be assimilated by the plant. The formation of such soil solution is dependent upon the maintenance of a sufficient quantity of water, either by rain or other means, in the soil at all times. In cases of drought, the growing plants suffer greatly from lack of the requisite liquid and consequently of food. This undesirable condition, of course, is eliminated when the plant roots are kept immersed in or in contact with an aqueous nutrient solution of readily available food. Again, roots of soil-grown plants are subject to the attack of insects or parasites whose natural habitat is in the ground, and as a result there may be a considerable mortality of plants due to the ravages of such animals. Losses due to such causes, however, can be avoided when hydroculture methods are employed. Furthermore, certain plant diseases, e. g., blights or rusts, originate from or are caused by some types of bacteria in the soil. The application of water-culture methods should reduce to a minimum unhealthy plants resulting from the attacks of diseases traceable to such influences.

Since plants cultivated by hydroculture methods are grown under almost ideal conditions (abundance of water and food and substantially free of the destructive influences of soil diseases and insects) they become much larger in stature than the corresponding soil-grown varieties. This increased growth is often accompanied by an increase in the yield and size of fruit or flowers.

As an example of a plant which will respond to hydroculture methods, the tomato can be cited. When cultivated by such procedures it may grow to heights of 15 or 16 feet or even greater. Although initially the plant may furnish tomatoes when it is only a few feet tall, say 5 or 6 feet, nevertheless, when these enormous and unusual growths of 15 or 16 feet or more are obtained it has been observed that the upper part, say the upper seven or eight feet, is the fruit-producing portion. The lower part although remaining green and retaining leaves (and therefore still alive) is substantially devoid of fruit-producing qualities. Stated in other words, it appears that the new plant growth is responsible for the production of fruit while the old growth merely acts as a means for transporting liquid and nutrients from the source of supply to the upper portion. Another view which may be taken is that old roots are feeding new branches so that a state will be reached when the plant's rate of yield of fruit will no longer warrant its continued growth.

To obviate this latter condition, i. e., excessive height of plant accompanied by a corresponding decrease in yield, I propose to regulate the growth so that the plant will remain substantially constant in height while at the same time it is continually developing new branches or stems which in turn give rise to more fruit or flowers. Furthermore I propose to accomplish this by removing the old or non-productive stalk at periodic intervals. By the latter step only the new or productive portion is being cultivated uninterruptedly and the plant may never exceed a height sufficiently great as to render its productive capacity so low that continued cultivation is economically unwarranted.

As an illustration of the method whereby I may secure the objects of my invention the following procedure is applicable for the growing of tomato plants. A wire basket which serves as the holder for the plants is placed in a tank, or other container, of convenient size and shape, and is held in place (about 6 or 8 inches above the bottom of the tank) by means of supports attached to the sides of the container. The openings in the wire meshes of the basket should be about 1 inch square to allow the plant roots (and possibly a portion of the stalk) to extend through the bottom of the holder. Beneath the latter is kept a supply of nutrient solution into which the roots dip and remain continually immersed. It is preferable that the basket be close fitting with the tank so as to avoid exposing the nutrient solution to sunlight and thus inducing the development of algae. It is desirable also that the tank be equipped with a drain so that a periodic flushing with water can be effected.

Into the basket, filled with an inert material such as straw which serves as a support, are placed young tomato plants which have been sprouted in soil or sand. The straw is kept moist with nutrient solution until the plant roots have grown sufficiently to extend through the meshes of the wire basket. When this happens, the tank is filled with liquid nutrient until the latter covers at least a portion of each plant root and until the liquid level is, say, one-half inch below the bottom of the basket. As the plants continue to grow the liquid level may be lowered somewhat. However, the roots should at all times be sufficiently immersed in the liquid so they always have ready access to an abundance of water and assimilable nutrient.

A nutrient solution which I have employed with tomatoes and have found gives good results is made by dissolving 5.8 grams of superphosphate (monocalcium phosphate plus calcium sulphate), 6.4 grams of sodium nitrate, 10.3 grams of magnesium sulphate (Epsom salts) and 3.9 grams of potassium chloride (muriate of potash) in 5 gallons of water. To secure the presence of trace elements, there can be put into the above solution about 10 cc. of an aqueous solution consisting of 0.8 gram each of boric acid, manganese sulphate and zinc sulphate in one pint of water. To the resulting mixture can be added 100 cc. of a solution made by dissolving 0.8 gram of ferrous sulphate ($FeSO_4 \cdot 7H_2O$) in one pint of water.

As the tomato plants continue to grow some liquid and also some of the nutrients dissolved therein are consumed. In addition, some water is lost by evaporation. The liquid losses may be made up by merely adding the necessary quantity of water to the nutrient solution or by spraying the plant and allowing the aqueous drippings to fall into the tank. Occasionally a portion of newly prepared nutrient solution may be incorporated with that in which the plant roots are immersed. Periodically the liquid in the container is drained, the latter flushed with water and then again filled with freshly made nutrient liquor. This operation is necessary not only because dissolved nutrients are consumed (by the growing plant) and their respective concentrations are continually becoming less but also because the roots excrete certain bodies which if allowed to accumulate eventually exert a toxic effect upon the plant.

The tomato plants are allowed to grow and bear fruit, which can be gathered and utilized as desired. During this period the plant may become six, seven or even eight feet in height. As the latter varies considerably with individual plants, no particular measure can be specified. However, it can be noticed readily when the lower portion of the stalk becomes non-productive (since it will retain only green leaves) and the upper portion continually produces new or green branches which in turn will furnish fruit. When this type of growth occurs the lower, or older, part of the stalk is pushed down for a short distance into the liquid nutrient so that it may develop new roots which will serve as means for feeding the plant. After new roots appear, some of the old roots (equal in length to the portion of stalk which was submerged) may be cut off. As the plant continues to grow in height and new branches appear on the upper portion, the older stalk can be pushed deeper and deeper into the liquid and simultaneously more of the older, previously submerged roots and stalk eliminated by cutting. In this manner the height of the plant may be maintained substantially constant and the plant consist for the most part of new and productive growth.

It is essential, of course, that the older portion of the stalk, i. e., that part above water or the nutrient solution, be immersed in the nutrient liquid at about the same rate at which new growth develops. However, this operation should not be done so rapidly as to necessitate cutting off or trimming an unduly large proportion of old roots, otherwise the plant may be adversely affected. Also in some cases the rate of outgrowth of new roots may be slow. In such instances the usually-employed nutrient solution may be replaced for a day or so by one containing an accelerator of root growth, e. g., $\beta$-indolylacetic acid. By so doing root growth or formation is hastened and the danger of the plant not possessing an abundance of feeding members for an excessively long period of time may be avoided.

The above described method of regulating and controlling the height of growing plants is illustrated by the propagation of tomato plants in nutrient solution. I do not wish to limit myself only to such a procedure, as other modifications of this method are known. For example, the young plant or vegetable may be placed in an inert medium (such as coarse sand or cinders) which is moistened with water and which is held in a container of suitable dimensions and size and the nutrient solution allowed to drip slowly thereon from a reservoir conveniently placed above said container. In this way the plant roots are continually in contact with a solid, porous medium always wet with the nutrient liquor. The latter seeps through the inert material and flows through drains (in the bottom of the container) into a sump. When this is full, the liquid is transferred to the reservoir and again allowed to drip onto the inert medium. In this manner the nutrient liquor may be recirculated several times before it is discarded. When the plant has attained the requisite growth it may then be bent over so that part of the older stalk can be inserted beneath the surface of the wet inert medium, i. e., immersed in the nutrient liquor, and new root growth developed thereon. After this new development has proceeded to a sufficient degree the old roots (and portion of stalk attached thereto) may be cut off and taken out of the inert supporting medium. It is thus possible to cultivate continually a plant consisting substantially of new and productive growth.

Regardless of the particular type or modification of solution culture employed, it is well understood that the plants must at all times be furnished with the necessary quantity of sunlight to secure healthy growth. Furthermore, they must be protected from extreme variations in temperatures. In localities where the climate will not permit out-of-doors growing the whole year, cultivation may be prosecuted, for example, in greenhouses. Furthermore, the inert material which serves as a support for the young plants will become inadequate as the plants are growing and attaining their normal height. This will necessitate, of course, placing convenient external supports near the tanks or containers in which plant cultivation is being effected.

Although my invention has been illustrated by the growing of tomatoes I do not wish to be limited to that plant. Other vegetables which may serve equally well include those such as peas, beans and cucumbers. Neither do I wish my invention to be limited to vegetables, as the procedures herein described may be applied to flowers, as for example, roses, non-tuberous begonia, peonies, and the like.

As will be noted, my invention comprises regulating the height which plants may attain when they are cultivated by hydroculture methods. It also involves the continual and measured submerging, into the nutrient solution, of a portion of the non-productive stalk above water and allowing new roots to develop on said submerged portion. When these new and more vigorous members have grown sufficiently, then some of the older and previously developed and submerged roots and/or stalk is removed by trimming. The rate at which the stalk is submerged into the nutrient solution should be equal approximately to that at which the plant is putting forth new growth. Another phase of my invention contemplates maintaining the plant at all times in a state of productivity since by eliminating the old stalk or stem substantially only the newer or more active portion is actually being propagated. As a result, the capacity of a plant to yield fruit or flowers, as the case may be, should be correspondingly larger than when it is permitted to grow uncontrolled.

By hydroculture I include not only the method whereby plant roots are kept immersed in a liquid nutrient but also any of its various modifications. Examples of the latter are procedures involving the use of beds of sand or cinders, or mixtures of these, saturated or impregnated (as the case may be or as may be required) with nutrient solution.

What I claim is:

1. In the hydroculture of non-aquatic and non-tuberous, seed-bearing plants by maintaining the roots of said plants immersed in an aqueous solution of plant nutrients and the major proportion of the stalks of said plants above the surface of said aqueous solution, the steps which comprise submerging into the nutrient solution a portion of the above-water non-productive stalk immediately adjacent to previously developed roots of a mature plant, said submerging being effected at substantially the rate at which said plant grows, maintaining said submerged portion of stalk in the nutrient solution to effect development and growth of roots thereon, and removing a portion of the previously developed and submerged roots and stalk, whereby the height of said mature plant is kept substantially constant and said mature plant consists substantially of new and productive growth.

2. In the hydroculture of non-aquatic and non-tuberous, seed-bearing plants by maintaining the roots of said plants immersed in an aqueous solution of plant nutrients and the major proportion of the stalks of said plants above the surface of said aqueous solution, the steps which comprise submerging into the nutrient solution a portion of the above-water non-productive stalk immediately adjacent previously developed roots of a mature plant, maintaining said submerged portion of stalk in the nutrient solution to effect development and growth of roots thereon, and removing a portion of the previously developed and submerged roots and stalk.

3. In the hydroculture of non-aquatic and non-tuberous, seed-bearing plants by maintaining the roots of said plants immersed in an aqueous solution of plant nutrients and the major proportion of the stalks of said plants above the surface of said aqueous solution, the steps which comprise submerging into the nutrient solution of a portion of the above-water non-productive stalk immediately adjacent to previously developed roots of a mature plant, said submerging being effected at substantially the rate at which said plant grows, and maintaining said submerged portion of stalk in the nutrient solution to effect development and growth of roots thereon.

MILLER W. SWANEY.